United States Patent [19]
Batley, Jr.

[11] 3,821,346
[45] *June 28, 1974

[54] PET LITTER PRODUCED BY RECYCLED MOLASSES SERUM

[75] Inventor: William R. Batley, Jr., Brawley, Calif.

[73] Assignee: William R. Batley, Jr., Brawley, Calif.

[*] Notice: The portion of the term of this patent subsequent to Nov. 27, 1990, has been disclaimed.

[22] Filed: Feb. 16, 1972

[21] Appl. No.: 226,831

Related U.S. Application Data

[63] Continuation-in-part of Ser. No. 167,901, Aug. 2, 1971, Pat. No. 3,775,133.

[52] U.S. Cl............ 264/115, 119/1, 260/112, 426/364, 426/489, 426/378, 426/454, 264/115, 264/120
[51] Int. Cl............................................. A23k 1/02
[58] Field of Search.............. 99/6, 8, 199, 204; 264/115, 117, 120; 426/364, 378, 489, 454; 260/112; 119/1

[56] References Cited
UNITED STATES PATENTS

| | | |
|---|---|---|
| 2,552,343 | 5/1951 | Peebles............... 99/8 |
| 3,420,671 | 1/1969 | Hess..................... 99/2 |
| 3,551,163 | 12/1970 | Vincent................ 99/6 |
| 3,684,520 | 8/1972 | Bickoff................. 99/8 |

OTHER PUBLICATIONS

J. Agr. Food Chem., Vol. 18, no. 6, 1970, Knuchles, p. 1086–1089.

J. Sci. Food Agric., July 12, 1961, p. 502, 504 Chayen.

Primary Examiner—Norman Yudkoff
Assistant Examiner—Hiram H. Bernstein
Attorney, Agent, or Firm—Lyon & Lyon

[57] ABSTRACT

An improved pet litter is disclosed which has as its major ingredient the fiber fraction of alfalfa or other leafy green vegetable fibers. The new litter is prepared by squeezing chopped leafy green crops in the presence of water, ammoniated water or ammoniated serum derived from the rolled juice. The resulting pressed cake is then subjected to a low temperature drying operation followed by procedures to produce a pelletized absorbent fibrous material.

10 Claims, 1 Drawing Figure

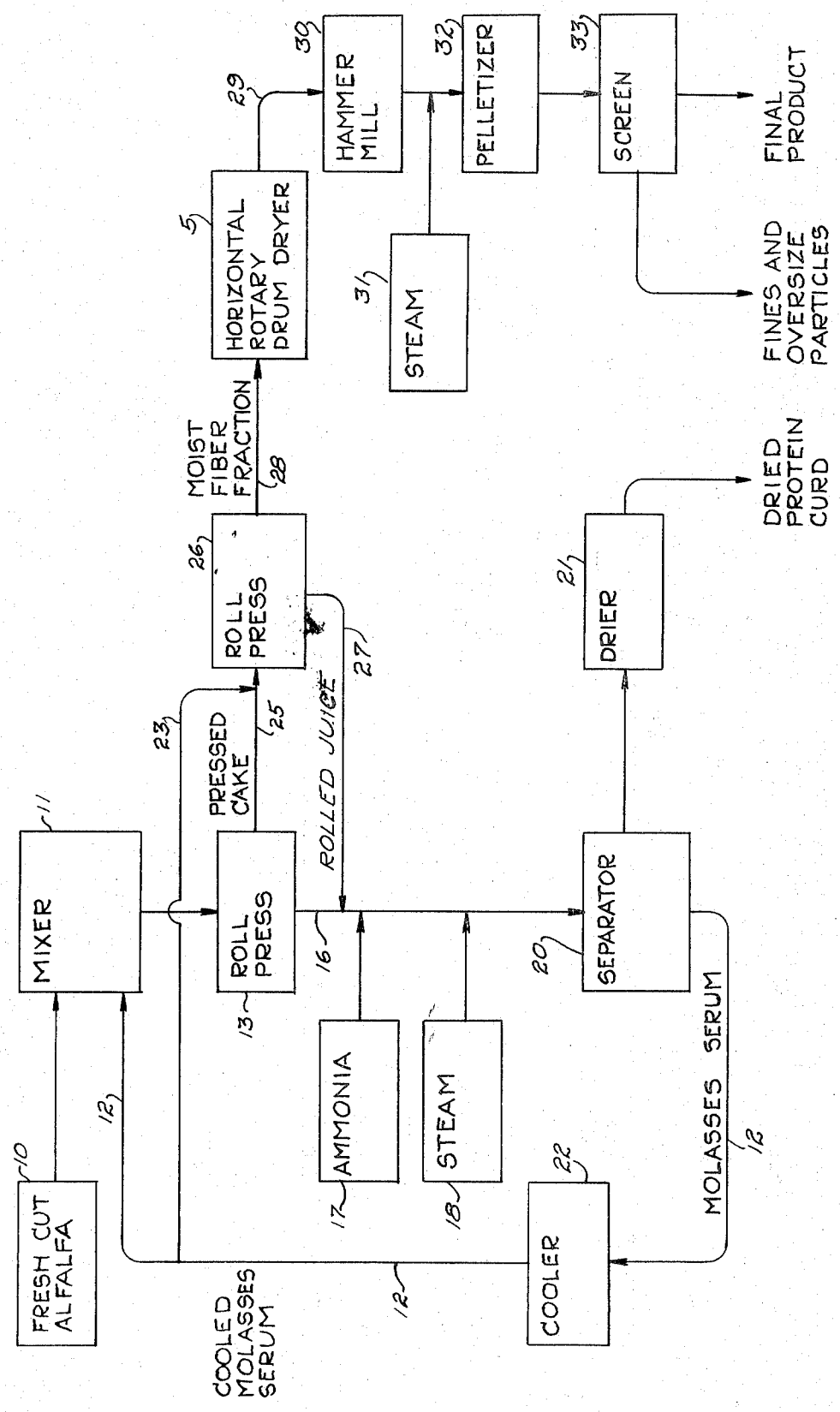

PET LITTER PRODUCED BY RECYCLED MOLASSES SERUM

CROSS-REFERENCE TO RELATED APPLICATIONS

This is a continuation in-part of application Ser. No. 167,901 filed Aug. 2, 1971 now U.S. Pat. No. 3,775,133.

BACKGROUND OF THE INVENTION

The field of the invention is animal litter preparations and more specifically relates to an improved absorbent fibrous material useful for pet litter. It has been known to use ordinary dehydrated alfalfa as a pet litter. Unfortunately, ordinary dehydrated alfalfa suffers from several shortcomings relating to its odor and its somewhat limited ability to absorb liquid animal waste.

Various systems have been known to produce ordinary dehydrated alfalfa used as an animal feed ingredient. An improved production method involves the fractionation of alfalfa to produce a dried protein curd. This improved method is disclosed in application Ser. No. 167,901 filed Aug. 2, 1971 by the present applicant. The disclosure of that application is incorporated by reference herein. In that improved process, the protein content of the final dried product was held at 17 percent or greater. That process produced protein curd together with a pressed cake which, in that process, was heated at conventional alfalfa drum drying temperatures which are typically at about 1,600° inlet temperature.

SUMMARY OF THE INVENTION

The present invention is for an improved pet litter resulting from the low temperature drying of highly squeezed alfalfa fibers. Fresh alfalfa is squeezed in the presence of water, ammoniated water or ammoniated molasses serum which in turn is produced from the separation of protein curd from rolled juice. This squeezing operation creates the rolled juice and a pressed cake. After the chopped alfalfa has been squeezed in the presence of water, ammoniated water or ammoniated molasses serum to a moisture content of below 70 percent, it is passed to a drying stage where the maximum temperature is held below 1,400° F. and preferably below 1,000° F. The fibrous fraction leaving the drier may then be processed to produce a final pellet which has exceptionally low odor and high liquid absorbing properties. This new product is especially useful as a pet litter being superior to conventional dehydrated alfalfa or the dehydrated alfalfa produced by the process disclosed in application Ser. No. 167,901 filed Aug. 2, 1971.

BRIEF DESCRIPTION OF THE DRAWING

The drawing shows a flow sheet of a process useful for the preparation of the product of the present invention.

DESCRIPTION OF THE PREFERRED EMBODIMENTS

The present process will be described as applied to alfalfa but other green crops such as grasses, clover, and the like may also be used. As shown in the drawing, freshly cut alfalfa 10 is fed to a mixer 11 where it is mixed with a stream 12 of cooled ammoniated molasses serum. The source of this serum will be described below.

The mixture is next fed to a first roll press 13 which may be a conventional sugar cane press. Other types of presses may also be used such as auger presses, expeller presses and the like. This pressing step results in a liquid stream 16 and a pressed cake 25. The pressed cake may be mixed with additional molasses serum 23 and fed to a second roll press 26 in order to arrive at the desired moisture content of below about 70 percent moisture. A second stream 27 of rolled juice is combined with stream 16. The second roll press 26 may also be a sugar cane roll press utilizing three rolls driven by an electric motor through a reduction gear. It is advantageous to adjust the roll nip of both presses wide enough to permit the passage of fiber through the nip and yet narrow enough so that the resulting pressed cake from the second roll press (or the first roll press if only one press is used) is below about 70 percent. The use of two or more squeezing steps results in a greater removal of soluble materials from the fibrous fraction.

The moist fiber fraction 28 is fed to a horizontal rotary drum drier 5. Drier 5 is of conventional design, is gas fired and air is mixed at the throat of the drier with the 1,600°F. combustion gasses to control the temperature. The temperature of drier 5 should be held below about 1,400°F. and preferably about 1,000°F. It has been discovered that the odor of the finished product can be substantially reduced by the use of this low temperatured drying step. It is believed that this reduction is caused by the reduced amount of burned or charred fibers and lower level of scorched protein and sugars which remain in the fibers. The product of the present invention has an odor more like sun-dried alfalfa hay than does ordinary dehydrated alfalfa.

The dried fiber fraction 29 exiting drier 5 is fed through a hammer mill 30 which may be a conventional hammer mill used in dehydrated alfalfa processing in order to compact or compress the fiber fraction. The product leaving mill 30 is mixed with steam 31 and passed through a pelletizer 32. The pelletizer 32 is operated to produce a pellet having a diameter of about one-eighth of an inch and a length of about one-eighth of an inch. This pelleted material is next passed to a screen 33 where over-sized particles and fines are removed. The final product is now ready for packaging.

The rolled juice 16 and 27 leaving roll presses 13 and 26 is ammoniated by feeding a stream of ammonia 17 directly into the liquid line. The pH of the ammoniated juice should be between about 8 and 9 and preferably about 8½. The juice is next heated by the injection of steam 18 to increase its temperature to about 180°F. The pH and temperature adjustment causes a precipitation or separation of protein curd and molasses serum. The curd may be separated by gravity and dried and has found wide acceptance as a high protein feed additive. Further details of this separation may be found in U.S. Pat. application Ser. No. 167,901 referred to above.

The molasses serum which still contains some ammonia is next cooled in cooler 22 which may be an evaporative cooler. It is preferable that serum be cooled to below about 100° F so that no protein will be coagulated in the mixer 11 or in the roll presses 13 and 26. Any molasses serum not required to sufficiently wet the alfalfa may be passed to storage for use in conjunction with a conventional dehydrated alfalfa process to produce an animal feed additive or may be passed to waste. It is highly advantageous that the pressing step be carried out in the presence of the molasses serum as this has been found to greatly increase protein and soluble solid removal.

It is not essential that the pressing steps be carried out in the presence of ammoniated molasses serum. Water, which may or may not be ammoniated, may be used instead. It is highly beneficial to carry out the pressing steps in the presence of some additional liquid, however, since the additional liquid helps to remove a larger amount of soluble materials than does squeezing alone.

While ordinary dehydrated alfalfa has a protein content of 17 percent or more, the fiber fraction of the present invention is ordinarily below 17 percent and may be as low as 14 percent. Also, the density of the product of the present invention is lower than that of ordinary dehydrated alfalfa. (35 to 40 lbs. / cu. ft. as compared to 42 to 46 lbs. / cu. ft. for ordinary dehy.)

Most significant differences exist in the ability of the product of the present invention to absorb liquids as compared to dehydrated alfalfa, or dried whole alfalfa. The data shown below were obtained on samples which had been dried in air at room temperature for 72 hours:

SAMPLE IDENTIFICATION

| Sample No. | COMPOSITION |
| --- | --- |
| 1 | Crumbled, Dehydrated Alfalfa Pellets, about ⅛" by ⅛" size |
| 2 | Dehydrated Whole Alfalfa, ¼" by ¼" Pellets |
| 3 | Dehydrated Whole Alfalfa, ⅛" by ⅛" Pellets |
| 4 | Ground, Crumbled Dehydrated Alfalfa, 1mm. particle size |
| 5 | Air-Dried Whole Alfalfa (not pelletized), 1mm. particle size |
| 6 | Once Pressed Alfalfa Fiber Fraction, Air-Dried |
| 7 | Twice Pressed Alfalfa Fiber Fraction (2nd press in H₂O air-dried) |
| 8 | Twice Pressed Alfalfa Fiber Fraction (2nd press in ammoniated molasses serum) air-dried |
| 9 | Dehydrated Alfalfa, ⅛" by ⅛" Pellets ground to 1mm. particle size |

Samples 1 through 3 were tested as received and were mixed with an excess of water or urine. The amount of unabsorbed liquid was then measured at 5 minute intervals. Samples 4 through 9 were ground in a Wiley Mill to pass through a 1 millimeter screen and then were tested in the same manner as Samples 1 through 3. The results are shown in Table 1:

Table 1

| | AMOUNT DISTILLED WATER/URINE ABSORBED IN % BY WEIGHT AFTER TIME INDICATED IN MINUTES | | | | |
| --- | --- | --- | --- | --- | --- |
| Sample No. | 10 | 20 | 30 | 40 | 50 |
| 1 | 220/180 | 250/210 | 265/230 | 270/240 | 275/245 |
| 2 | 70/40 | 95/65 | 115/80 | 135/95 | 155/110 |
| 3 | 140/100 | 190/145 | 235/180 | 260/215 | 275/250 |
| 4 | 295/280 | 300/285 | 300/285 | 300/285 | 300/285 |
| 5 | 370/275 | 380/330 | 385/340 | 390/345 | 390/350 |
| 6 | 335/335 | 355/390 | 365/400 | 375/405 | 380/405 |
| 7 | 365/460 | 390/460 | 400/460 | 405/460 | 405/460 |
| 8 | 305/405 | 310/405 | 315/405 | 315/405 | 315/405 |
| 9 | 300/275 | 305/290 | 325/325 | 325/325 | 330/325 |

Surprisingly, Samples 6 and 7 (the samples made according to the present invention) had the ability to absorb a greater percentage of urine than water whereas dehydrated alfalfa whether ground or not absorbed a higher percentage of water than urine. It is believed that this ability of the product of the present invention results from the removal of soluble matter from the alfalfa by the pressing step or steps. Thus, the alfalfa fiber fraction of the present invention can absorb a relatively larger amount of a fluid containing dissolved material than can ordinary dehydrated alfalfa. Furthermore, the total amount of liquid absorbed by the alfalfa fiber fraction (Samples 6 and 7) was substantially greater than the ground dehydrated alfalfa (Sample 4). For instance, after 50 minutes Sample 6 had absorbed 3.80 times its weight of water, Sample 7—4.05 as compared to Sample 4 which had absorbed only three times its weight of water. The comparison using urine is even more dramatic where Sample 6 absorbed 4.05, Sample 7—4.60, whereas Sample 4 absorbed only 2.85 times its weight of urine. Note that Samples 5 through 8 were air-dried which simulates the low temperature drying described above.

The product of the present invention not only has greater absorption properties, more pleasant odor, but is also lighter in weight per unit volume as compared to dehydrated alfalfa. Still further, valuable byproducts may be recovered from the rolled juice extracted from the fiber fraction. One method of processing this juice is disclosed in applicant's U.S. Parent application Ser. No. 167,901 filed Aug. 2, 1971.

The cat litter after a prolonged period of use may be readily disposed of by merely spreading on the garden or flushing down the toilet. Its ingredients are readily handled by normal sewage treatment facilities unlike many litter products. The litter product maintains its rich green color throughout use and masks unsightly refuse. The natural chlorophyll, of course, acts as a deodorant.

The present embodiments of this invention are thus to be considered in all respects illustrative and not restrictive, the scope of the invention being indicated by the appended claims rather than by the foregoing description. All changes which come within the meaning and range of equivalency of the claims therefore are intended to be embraced therein.

I claim:

1. A process for preparing a pet litter comprising:

mixing fresh alfalfa with a liquid selected from the group consisting of recycled molasses serum and recycled ammoniated molasses serum to produce a fresh alfalfa slurry;

subjecting said slurry to pressing means to remove a portion of said liquid and a portion of the natural juice contained in said fresh alfalfa and to yield a rolled juice stream and a pressed cake containing the fibrous fraction of said fresh alfalfa and having a protein content below 17 percent;

coagulating said rolled juice stream to form a curd;

separating said curd from the uncoagulated portion of said rolled juice thereby producing a protein curd portion and a molasses serum portion which provides the source for said recycled molasses serum and ammoniated molasses serum; and, subjecting said pressed cake to a drying step to yield a dried fiber fraction.

2. The process of claim 1 wherein said liquid is ammoniated molasses serum.

3. The process of claim 1 wherein said step of subjecting said slurry to pressing means comprises passing said slurry through a three roll sugar mill.

4. The process of claim 1 with the additional steps of:

mixing said pressed cake with a liquid capable of dissolving at least a portion of the non-fibrous fraction of said fresh alfalfa to produce of pressed cake slurry; and subjecting said pressed cake slurry to pressing means to remove at least a portion of said liquid and any further solute dissolved therein.

5. The process of claim 4 with the additional step of subjecting the twice pressed cake to at least one additional mixing and pressing step.

6. The process of claim 1 wherein said drying step is carried out below about 1,400°F.

7. The process of claim 1 further including the step of passing said dried fiber fraction to pelletizing means.

8. The process of claim 7 wherein said step of passing said dried fiber fraction to pelletizing means comprises the steps of:

subjecting said dried fiber fraction to a hammer mill whereby said dried fiber fraction is pulverized and disintegrated, adding steam to said pulverized and disintegrated fiber fraction to yield a moist, hot pulverized fraction; and passing said moist, hot pulverized fraction through a pelletizer.

9. The process of claim 8 wherein said pelletizer is operated to yield pellets having a diameter of about ⅛ inch and a length of about ⅛ inch.

10. The process of claim 1 wherein said liquid is molasses serum.

* * * * *